No. 813,714. PATENTED FEB. 27, 1906.
H. W. KETCHAM.
BOLT LOCKING WASHER.
APPLICATION FILED OCT. 30, 1905.
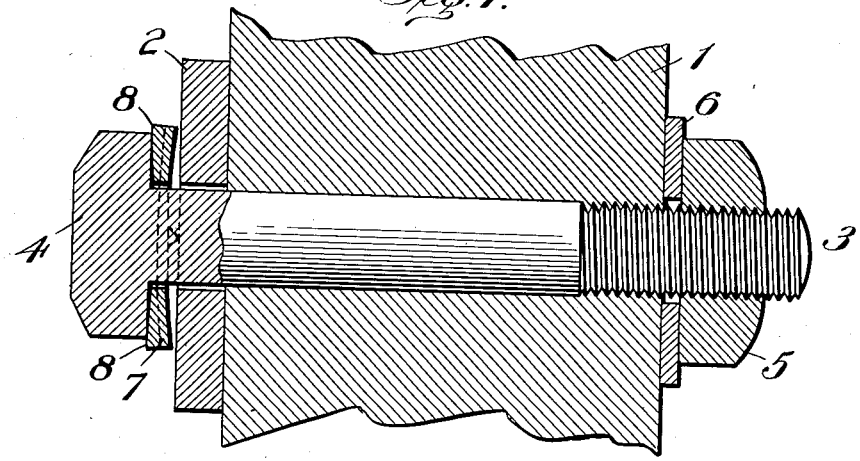
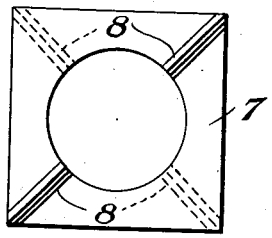
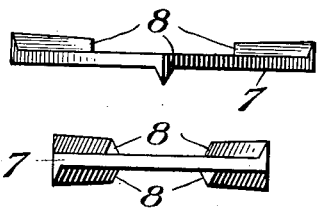
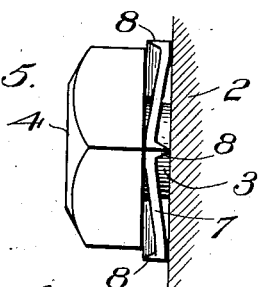
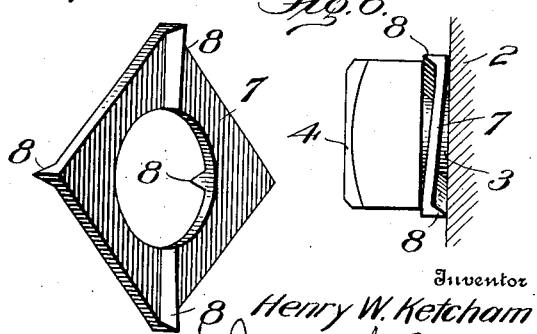
Witnesses
Edwin L. Bradford
Anne B. Johnson
Inventor
Henry W. Ketcham
By Johnson and Johnson
Attorneys

UNITED STATES PATENT OFFICE.

HENRY W. KETCHAM, OF PATCHOGUE, NEW YORK.

BOLT-LOCKING WASHER.

No. 813,714.　　　　　Specification of Letters Patent.　　　　Patented Feb. 27, 1906.

Application filed October 30, 1905. Serial No. 285,019.

*To all whom it may concern:*

Be it known that I, HENRY W. KETCHAM, a citizen of the United States, residing at Patchogue, in the county of Suffolk and State of New York, have invented certain new and useful Improvements in Bolt-Locking Washers; and I do hereby declare the following to be a full, clear, and exact description of the invention, such as will enable others skilled in the art to which it appertains to make and use the same.

I have devised an improvement for locking bolts whereby the bolt is the means for locking the nut, and for this purpose I apply the lock to the head of the bolt, and the means I provide is a spring-washer of novel construction applied to the inner plain surface of the bolt-head and to the plain surface of a fixed metal bar, so that the pressure of the bolt-head on the washer and the latter on the fixed metal bar will cause the bolt to draw on the threads of the nut and draw the nut against the part it clamps so strong that the spring of the washer will prevent the bolt from turning and cause it to be the means for locking the nut.

The accompanying drawings illustrate my improved bolt-lock, and in the claims appended hereto I will set out the parts and combination of parts which constitute my improvement.

Referring to these drawings, Figure 1 shows in section a nutted bolt with my improved spring-washer applied to its head and the parts to which the bolt and the nut are locked, the washer being shown as under partial compression. Fig. 2 shows the opposite faces of the spring-washer. Fig. 3 shows edge views of the spring-washer. Fig. 4 is a perspective view of the spring-washer. Fig. 5 is a side view showing the bolt-head and the spring-washer plate compressed, so as to twist it, causing it to bite into the bolt-head and into the bar. Fig. 6 is a like view showing the spring-washer plate when not under compression.

Of the parts to be bolted, let 1 represent a piece of a railway-rail or a part of a frame. 2 is a bar clamped against the part 1 and which may be the fish-plate of the rail. 3 is the screw-bolt, and 4 the bolt-head. 5 is the nut on the threaded end of the bolt, and 6 is the nut-washer, all of which may be and are of the ordinary construction, and with them I have combined a spring-washer 7, which, acting upon the bolt-head, locks the bolt and causes the bolt to lock the nut. The washer for this purpose is of steel, of square plate form, has a circular central opening, and is fitted upon the round bolt-shank between its head and the fixed plate 2, and by reason of its novel coustruction of ridges it is caused by the driving action of the nut to bite into the plain surfaces of the bolt-head and of the fixed bar to lock the bolt and by the spring function of the washer on the fixed plate cause the locking of the nut. The washer is of a thickness to allow is to have a yielding locking function both upon the bolt-head and upon the fixed bar, and for this purpose both faces of the washer are formed with sharp or biting ridges 8, the ridges on one side standing, preferably, at right angles to the ridges on the other side and on both sides radial at the corners of the square and extending therefrom to the center hole. The biting-ridges are V-shaped in cross-section and, being radial from the corners, will when the nut is driven up against its washer cause its ridges to bite or grip into the inner wall of the bolt-head and into the surface of the fixed bar, and thereby hold the washer and hold the bolt, the yielding function of the washer under the driving force of the nut serving also to lock the nut. This locking of the nut is effected by the yielding of the washer between its biting or sharp ridges, because as the ridges grip into the bar it holds the washer and causes the biting-ridges on its other side; by reason of being at right angles, to be sprung against the bolt-head. In this action the two biting-ridges on one side spring one way and the two biting-ridges on the opposite side of the washer are caused to spring the reverse way, and in this way the spring function of the washer comes on the bolt-head and on the nut, and it is the grip on the fixed bar that causes the bolt and the nut to be locked, and the washer thereby forms a double lock in which the pressure which brings into action the springing of the washer will draw against the threads of the nut and of the bolt, whereby the washer locks the nut at the same time that it locks the bolt.

I prefer to form the outer ends of the biting, ridges of greater projection from the surface of the washer than at the inner ends to cause their outer ends to first contact with the bolt and the bar, and thereby give the spring of the washer more to its outer edge and cause a more easy and uniform spring to the washer between the biting-ridges. This means of locking the bolt by the grip of the washer allows the nut to be loosened without the necessity of holding the bolt by a wrench, because the grip of the washer holds the bolt, and so far as I know and can find I am the first to keep the bolt from turning by means of a resilient-washer, which at the same time keeps the nut from turning under the effect of jar. It is important to note that in this disposition of the biting-ridges they stand in pairs, one pair being radial from two corners of the washer on one side and the other pair radial from the other two corners on the other side, and it is this disposition of the biting edges that gives the resilient capacity to the washer under pressure between two non-yielding bodies.

The thickness of the spring-washer is uniform and its walls are unbroken except by the biting-ridges, and they act with a grip and hold fast on plain metal surfaces against which no part of the surface of the washer contacts, so that there is a clear space between it and the bolt-head and between it and the fixed plate for free spring action, against both which is transmitted through the bolt to its threaded engagement with the nut. In this spring action the driving of the nut will cause the washer to twist in each of its four edges between the biting-ridges, giving an easy spring, as in Fig. 5, the twisting of the edges being between the biting-ridges.

I claim—

1. A bolt-lock comprising a screw-bolt, its nut, a fixed bar to be bolted, and a resilient washer of square form, arranged between the bolt-head and the fixed plate and having on each side a pair of sharp or biting ridges, those on one side at right angles to those on the other side, each radial from a corner, each of V shape in cross-section and each having a greater projection at their outer ends than at their inner ends from the surface, the ridges on one side biting into the bolt-head and the ridges on the other side biting into said fixed bar for locking thereby the bolt and its nut.

2. As an improved article of manufacture the bolt-locking washer herein described consisting of a square resilient plate having smooth parallel sides, one side having sharp ridges radial at two corners, the other side having sharp ridges radial at the other two corners, each ridge of V shape in cross-section and having greater projection from the surface at their outer than at their inner ends.

In testimony whereof I have signed my name to this specification in the presence of two subscribing witnesses.

HENRY W. KETCHAM.

Witnesses:
G. HOWARD ROE,
W. W. FURLONG.